United States Patent
Gee

(10) Patent No.: US 6,258,273 B1
(45) Date of Patent: *Jul. 10, 2001

(54) PROCESS FOR INSITU DECONTAMINATION OF GROUND WATER AND SOIL

(76) Inventor: John R. Gee, 130 Union Ave., Bala Cynwyd, PA (US) 19004

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,689

(22) Filed: Jan. 27, 1999

Related U.S. Application Data

(60) Provisional application No. 60/072,679, filed on Jan. 27, 1998.

(51) Int. Cl.⁷ .................................................. C02F 3/02
(52) U.S. Cl. .................. 210/620; 210/747; 210/170; 210/180; 210/901; 405/128
(58) Field of Search ................................ 210/170, 220, 210/180, 218, 602, 747, 610, 620, 901; 405/128

(56) References Cited

U.S. PATENT DOCUMENTS

| | | | |
|---|---|---|---|
| 4,057,401 | 11/1977 | Boblitz | 210/180 |
| 4,169,050 | * 9/1979 | Serfling et al. | 210/747 |
| 4,172,767 | 10/1979 | Sear | 202/182 |
| 4,221,571 | 9/1980 | Rhodes | 210/605 |
| 4,765,902 | 8/1988 | Ely et al. | 210/747 |
| 4,882,071 | 11/1989 | Bench et al. | 210/170 |
| 5,087,353 | * 2/1992 | Todd et al. | 210/170 |
| 5,344,557 | * 9/1994 | Scanzillo | 210/170 |
| 5,380,126 | 1/1995 | Bernhardt | 210/747 |
| 5,565,096 | * 10/1996 | Phelan | 210/170 |
| 5,601,382 | 2/1997 | Corte | 405/128 |

* cited by examiner

*Primary Examiner*—Christopher Upton
(74) *Attorney, Agent, or Firm*—Jeffrey D. Myers

(57) ABSTRACT

A method of and apparatus for decontamination of ground water or soil. The method and apparatus includes placing a structure into subsurface contaminated soil and ground water to enhance subsurface conditions for contaminant removal. Subsurface conditions are enhanced through a number of methods including exposure of contaminated soil and ground water to ambient air and sunlight.

2 Claims, 6 Drawing Sheets

PROCESS FOR INSITU DECONTAMINATION OF GROUND WATER AND SOIL

CROSS-REFERENCE TO RELATED APPLICATIONS

This application claims the benefit of the filing of U.S. Provisional Patent Application Serial No. 60/072,679, entitled "Biobox and Windaerator", filed on Jan. 27, 1998, and the specification thereof is incorporated herein by reference.

BACKGROUND OF THE INVENTION

1. Field of the Invention (Technical Field)

The present invention relates to the in-situ removal of contamination from ground water and soil. More specifically, the invention is a process and apparatus that enhances the oxygen, temperature, and other subsurface conditions to promote the physical, biotic, and abiotic removal of organic and some inorganic contamination from ground water and soil.

2. Background Art

Soil and ground water may be contaminated as a result of a release of compounds due to spills; leakage from storage, leaching of waste materials or by intentional acts such as dumping. Biodegradation of organic compounds by aerobic process can occur in the first three (3) feet below the earth's surface where oxygen is available from exchange with ambient air. However, if not isolated or removed that portion of the contamination below three feet largely remains unaffected by natural processes and commonly spreads. Oxygen normally can not reach this depth and conditions needed for anaerobic decomposition of the contamination are commonly not present (e.g., sufficient heat, mass of organics, nutrients, etc.).

Many methods and apparatus exist for decontaminating soil and ground water from compounds such as hydrocarbons and other organic and inorganic compounds. Common to these inventions are complex and elaborate means for achieving such decontamination by introducing heat and oxygen to a targeted area.

U.S. Pat. No. 5,601,382 to Corte et al. teaches an in-situ thermal system for decontaminating soil utilizing a sunlight transmitting, non-porous cover that allows solar energy to enter. Removal of contamination occurs as a result of a greenhouse effect in which trapped solar energy heats the interior air within the covering and in-situ soil below, vaporizing contaminants in the soil near the surface. This system is limited to decontamination of soil near the surface through assisted heating.

U.S. Pat. No. 4,765,902 to Ely et al., teaches an in-situ biodegradation system for hydrocarbon contaminated soil. Removal of contamination from soil occurs by evacuation of gas at high rates from bore holes drilled into the contaminated soil using a pump as a vacuum source. Evacuation of gas from the bore holes draws oxygen into the contaminated zone from the ground surface. Hydrocarbons and soil moisture are removed by evaporation, biodegradation, or creation of a hydrocarbon aerosol. This system requires significant power usage to create the vacuum needed and is limited to decontamination of soil. Removal by biodegradation is limited by the low temperatures that naturally occur below the earth's surface, and by the availability of moisture under vacuum conditions.

U.S. Pat. Nos. 4,593,760, to Visser et al, and 4,183,407 and 3,980,138, both to Knopic teach a system where evaporation of hydrocarbons in underground soil may be achieved by forced venting. However, this process is limited by the vapor pressure of the spilled hydrocarbons and the amount that can be evaporated. Since there is a limit on the amount of hydrocarbon that can be evaporated by venting, there is no incentive to go above a flow rate that provides the maximum evaporation. This system requires power usage for forced venting and is limited to decontamination of soil. Removal by biodegradation is limited by the low temperatures that naturally occur below the earth's surface.

Biodegradation has also been disclosed for underground hydrocarbons. U.S. Pat. No. 4,401,569, to Jhaveri et al, discloses a method and apparatus for treating hydrocarbon contaminated ground and ground water. Patentees disclose adding nutrients and gases to water that is flowed through the contaminated soil. A process of this type can be disadvantageous because: the irrigation water washes some hydrocarbons or other contaminants (toxic metal salts, etc.) into the water table; water carries a limited amount of oxygen (8 ppm) into the soil which limits the amount and the rate of degradation that may take place, irrigation can limit biodegradation by physically channeling oxygen-carrying fluids away from the hydrocarbon contaminated (oily) dirt.

Accordingly, there is the need for a process that will remove contamination from both soil and ground water though enhancement of natural removal mechanisms in an efficient and environmentally acceptable manner. This need has now been satisfied by the invention that is described below. Although each of the foregoing patents disclose devices and processes which are satisfactory for their intended purposes, none discloses a method or apparatus for decontaminating soil and ground water in the manner that is claimed herein:

SUMMARY OF THE INVENTION (DISCLOSURE OF THE INVENTION)

The present invention is a method of and apparatus for decontamination of ground water or soil. The method and apparatus includes placing a structure into subsurface contaminated soil and/or ground water to enhance subsurface conditions for contaminant removal. Subsurface conditions are enhanced through a number of methods including exposure of contaminated soil and ground water to ambient air and sunlight.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

Figure 1:
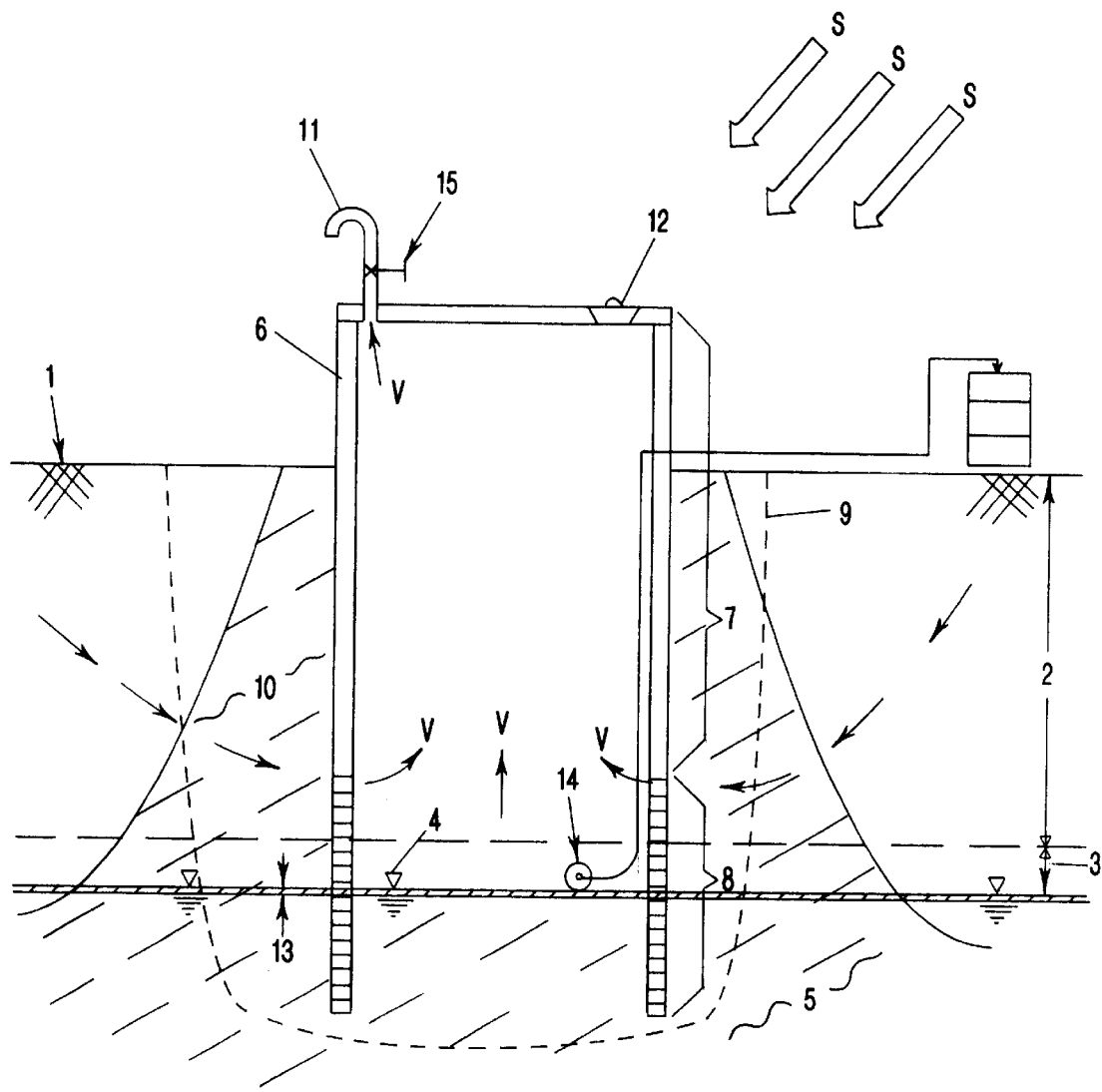
FIG. 1 is a schematic diagram of a larger apparatus useful in the present invention.

The present invention is useful for the removal of organic and some inorganic contamination in ground water and soil using enhanced natural and assisted methods including evaporation, volatilization, biodegradation, and other abiotic and biotic methods. According to the present invention, a process is provided for enhancing natural processes including biodegradation, volatilization, evaporation, aqueous photolysis, and bioconcentration to remove organic and some inorganic compounds from ground water and soil by essentially opening the subsurface to the earth's surface environment and using the opening to enhance oxygen transfer, temperature, solar energy, mixing conditions. The process comprises establishing an open excavation or large diameter borehole in a contaminated area which can reach a depth below the vadose zone in which a structure is installed which is utilized for enhancing subsurface conditions to remove contamination from both ground water and soil. A smaller version of the same invention could be used in a small borehole but with more localized and less enhanced effects.

As shown in FIGS. 1 through 6, a contaminated zone 10 can be contained within a vadose zone 2, capillary zone 3 and commonly extends into the ground water level 4 and ground water 5. The vadose zone 2 is defined by the earth's surface and the ground water level 4. There is also a capillary zone 3 just above the ground water level 4 where contamination can be supported in soil capillaries on top of the water. Subsurface contamination is often present in the soil moisture (liquid phase) of the vadose zone 2 and capillary zone 3. If a contamination is released in sufficient quantities to reach the ground water level, free liquid contamination can form a layer on the ground water level 13 if the contamination is less dense than water. Free liquid contamination in a layer on the ground water level 13 is commonly referred to as a light non-aqueous phase layer (LNAPL). It is contemplated that contaminants are removed when they are in the contaminated zone 10, the vadose zone 2, capillary zone 3, on or in ground water 5.

As shown in FIG. 1 through FIG. 6, a structure 6 is established in the contaminated zone 10. The structure 6 essentially extends into the earth's surface 1 and provides access to the contaminated zone 10 for vapor, air, solar energy, etc. The structure 6 can extend into the vadose zone 2, capillary zone 3, or preferably further downward below the ground water level 4. The structure 6 preferably includes a fluid impermeable lining 7 and a fluid permeable lining 8. The fluid impermeable lining 7 is preferably positioned within an excavation or borehole 9, typically near and/or above to the earth's surface 1. The fluid permeable lining 8 is also preferably positioned within the excavation or borehole 9, but in a position that ensures removal of contamination from the contaminated zone 10.

Figure 2:
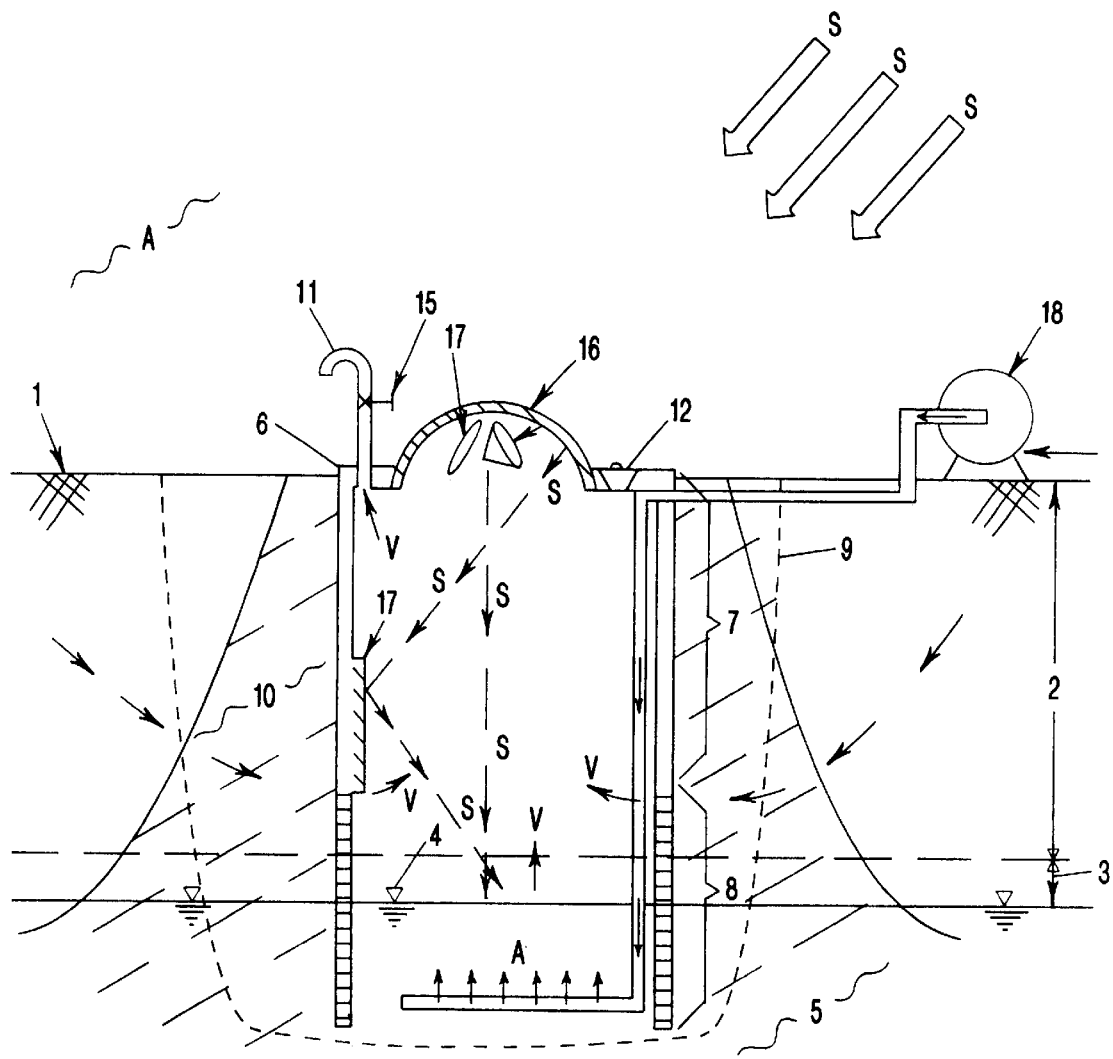
FIG. 2 is a schematic diagram of a larger apparatus With embodiments useful in the present invention.
Figure 3:
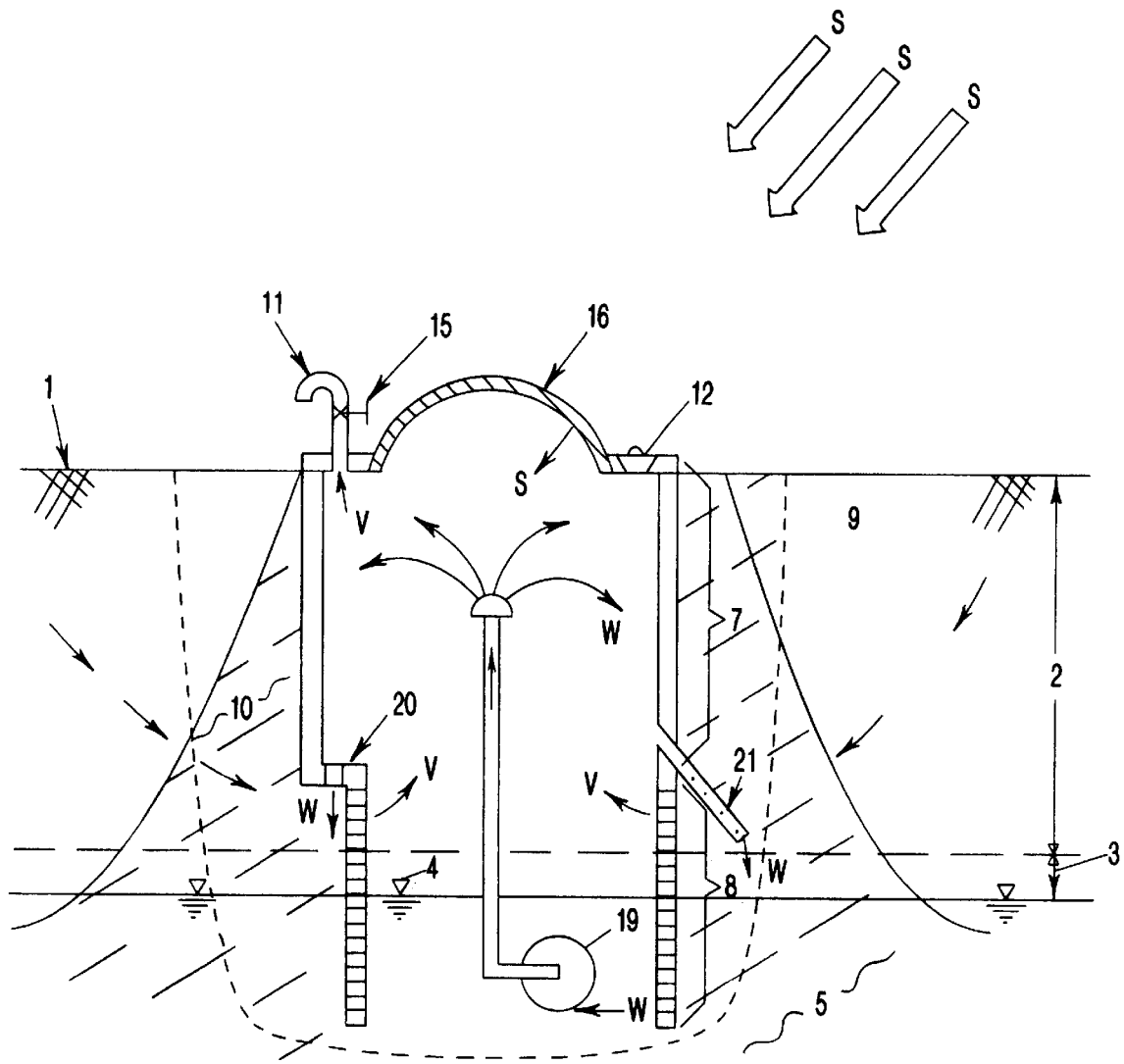
FIG. 3 is a schematic diagram of a larger apparatus with embodiments useful in the present invention.

A common method of removing soil and ground water contamination is by excavation into the contaminated zone 10 and offsite disposal of the excavated soil and ground water. As shown in FIGS. 1 through 3, the structure 6 can be established in the excavation or placed in a large diameter borehole. The structure 6 can be surrounded by fluid and air permeable soil or stone and/or geomembrane to assist oxygen flow to and through the contaminated zone and to or from the structure 6.

The structure 6 shown in FIGS. 1 exposes the subsurface soil (2 and 3) and ground water 5 to ambient air A and heat from solar energy S naturally increasing biodegradation and volatilization V, of contamination. Without any enhancements other than the exposure of soil (2 and 3) and ground water 5 to ambient air A and heat, organic compounds/contaminants will be removed. However, use of the structure 6 as an access point for further enhancement of contaminant treatment removal will increase the rate and degree of removal. The structure 6 can be modified in numerous ways to customize subsurface conditions most favorable to the particular type, amount, and location of contamination encountered. Some of the modifications possible are presented below.

If free liquid contamination 13 is present that is less dense than water, commonly referred to as a light non-aqueous phase layer (LNAPL), the present invention would be particularly effective in collecting the LNAPL for removal from the subsurface. Soil beneath the earth's surface 1 exerts capillary suction on LNAPL. When the LNAPL in the soil is exposed to ambient air pressure A, such as in a borehole, a release of capillary suction occurs which allows LNAPL to collect in the borehole. The thickness of LNAPL in the borehole is commonly four (4) times greater than the thickness of the LNAPL in the adjacent soil due to the release of soil capillary suction. The present invention will act in the same manner as any borehole, but with much greater ability to separate LNAPL from ground water 5. LNAPL commonly forms droplets in ground water as a result of ground water table fluctuations. When the ground water table drops, LNAPL will remain trapped in the capillaries above the falling ground water table. When the ground water table rises again, the trapped LNAPL will form isolated droplets beneath ground water table 4. To form an actual LNAPL layer 13 that can be removed from ground water these droplets must rise to the surface of the ground water table 4. The removal of these droplets from ground water in the present invention is defined by Stokes's law as follows.

$$A_h = \frac{Q}{g/18\mu(\rho_w - \rho_o)d^2}$$

Where
$A_h$=the horizontal area of exposed ground water in the present invention (cm$^3$)
g=the gravitational constant (981 cm/sec$^2$)
$\mu$=the absolute viscosity of ground water at the design temperature in poise
$\rho_w$=the mass density of ground water at the design temperature (gm/cc)
$\rho_o$=the mass density of the LNAPL at the design temperature (gm/cc)
d=the diameter of the LNAPL droplet to be removed (cm)
Q=the ground water flow through the present invention (cm$^3$/sec)

As shown by the above equation, the larger the area of the exposed ground water in the present invention the larger the flow of ground water that can be treated. Also the larger the area of exposed ground water the smaller the droplet size and the heavier the LNAPL (density) that can be removed from the ground water table 4. Therefore, the present invention will be significantly more effective in removing and collecting LNAPL than a small borehole having a smaller horizontal area. Once a LNAPL layer 13 forms in the structure 6 a skimmer or weir and collection basin 14 can be installed to collect LNAPL rising to the surface of the ground water 5. After collection, the LNAPL can be removed by pumping to the ground surface for recycling or disposal.

Another factor which influences LNAPL removal is temperature. Many LNAPLs become more viscous and denser in colder temperatures. As the LNAPL becomes denser, it's specific gravity moves closer to that of water making separation slower and more difficult LNAPL droplets can be removed from ground water at 90° F. twice as fast as in ground water at 40° F. As previously indicated the present invention provides sufficient access to ground water 5 to apply solar energy S or other power sources to heat the ground water 5 and air inside the structure 6, further enhancing LNAPL recovery. To prevent high discharge of contamination in the air phase the vent valve 15 can be adjusted and/or a treatment system for the air discharge can be added.

As shown in FIG. 1, the structure 6 can extend above the ground surface to be heated directly by solar radiation S or heat can be applied inside the structure 6 from other power sources. Heating the air inside the structure will cause the warmer air to leave the structure creating a vacuum in the lower part of the structure. When this air flow by convection is established, ambient air A will flow through the subsurface volatilizing contamination V in the subsurface soil (2 and 3). Convection air flow and hot air loss can be controlled by the vent valve 15.

The present invention produces the abiotic removal of volatile contamination in ground water 5 and in the water phase of the vadose and capillary zone. Removal of volatile contamination from water is commonly defined by Henry's Law. Henry's Law states that the solubility of any contaminant (gas or volatile liquid) in a liquid is proportional to the equilibrium partial pressure of the contaminant over the liquid. The proportionality may be expressed as an equation by use of Henry's constant:

$$P = HX$$

Where:
H=Henry's constant
P=partial pressure of the contaminant in the air phase
X=mole fraction of the contaminant in the water phase The larger the Henry's constant, the greater will be the equilibrium concentration in air. Thus by decreasing the partial pressure of the contaminant in the air phase (decreasing the concentration of the contaminant in the air phase) over the contaminated water, more contaminants will be removed to the air phase from the water phase. The structure proposed 6 will provide a source of ambient air A over ground water 5 having no contaminant concentration, thereby increasing the removal of contaminants to the air phase V. Once in the air phase they can be released using the vent 11 shown in FIGS. 1 through 3, 5 or 6 or controlled using a valve on the vent 15 or a treatments system attached to the vent.

Environmental factors important for enhanced aerobic biodegradation of organic contaminants include oxygen, temperature; availability of water, pH and nutrients. All living organisms require water for growth. Thus, contaminated soils must be at least partially saturated to ensure that sufficient water is available to microorganisms in the soil. Sufficient free oxygen must also be available for aerobic respiration. Water with a dissolved oxygen content of 2.0 mg/l or more should be used to ensure oxygen availability.

The present invention exposes subsurface soil 2 and ground water 5 to oxygen present in ambient air A The rate of transfer of oxygen is generally proportional to difference between the existing water concentration and the equilibrium concentration of oxygen in solution. In equation form this relationship can be expressed as:

$$\frac{dm}{dt} = K_g A (C_s - C)$$

where:
dm/dt=rate of oxygen mass transfer
$K_g$=coefficient of diffusion for gas
A=area through which oxygen is diffusing
$C_s$=saturation concentration of oxygen in solution.
C=concentration of oxygen in solution.

Since subsurface water normally does not have any oxygen concentration (anoxic), exposure of ground water 5 to ambient air A (which normally contains approximately 21 percent oxygen) will result in the transfer of oxygen to subsurface water. The amount of oxygen required is dependent upon the rate of ground water flow through the present invention, the location, mass and characteristics (biodegradability) of subsurface contamination requiring removal, the desired rate of removal, and other factors. As shown in the above equation, the larger the area of ground water 5 exposure to ambient air A in the present invention, the more oxygen will be transferred.

Figure 5:
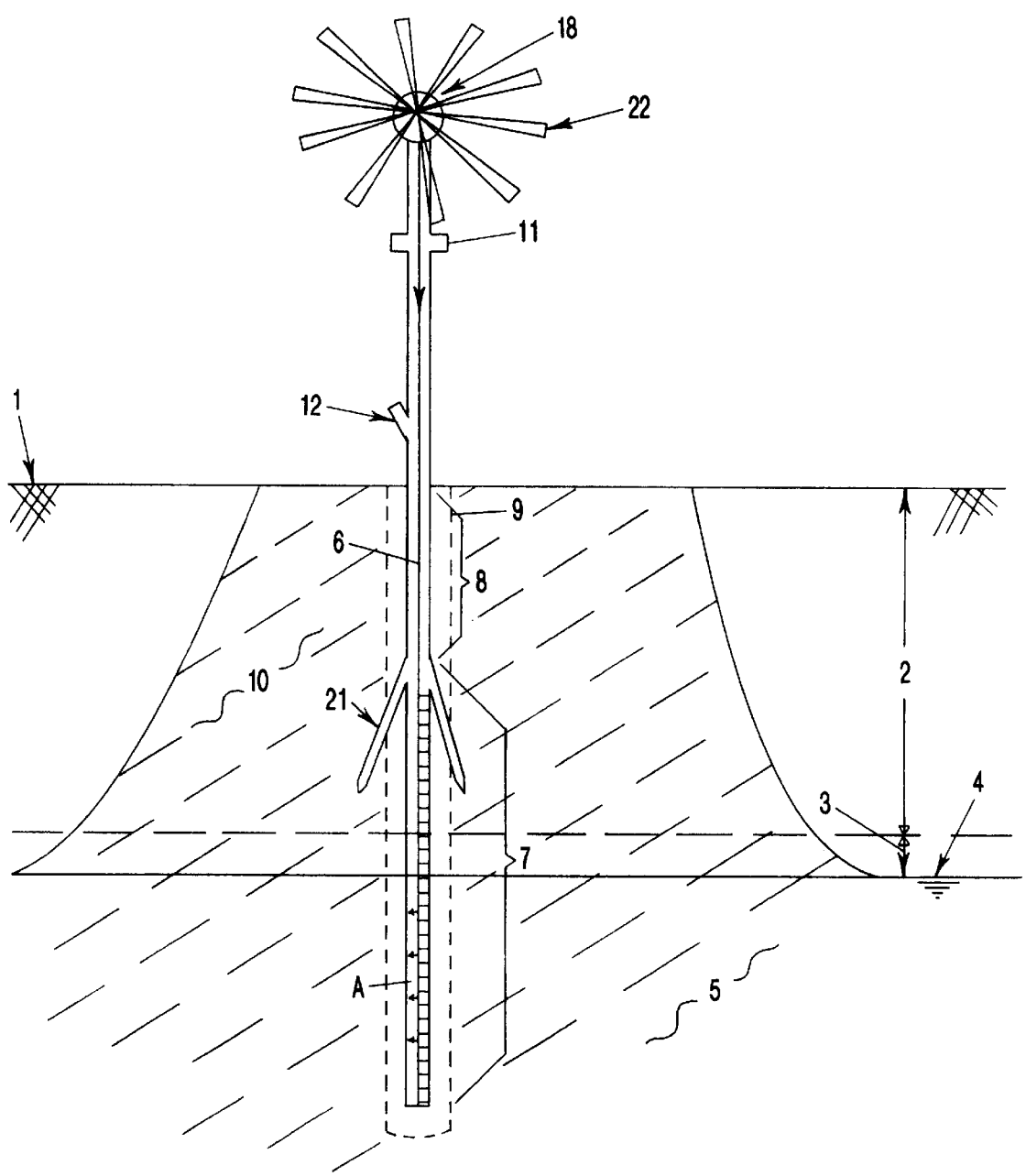
FIG. 5 is a schematic diagram of a smaller apparatus with embodiments useful in the present invention.
Figure 6:
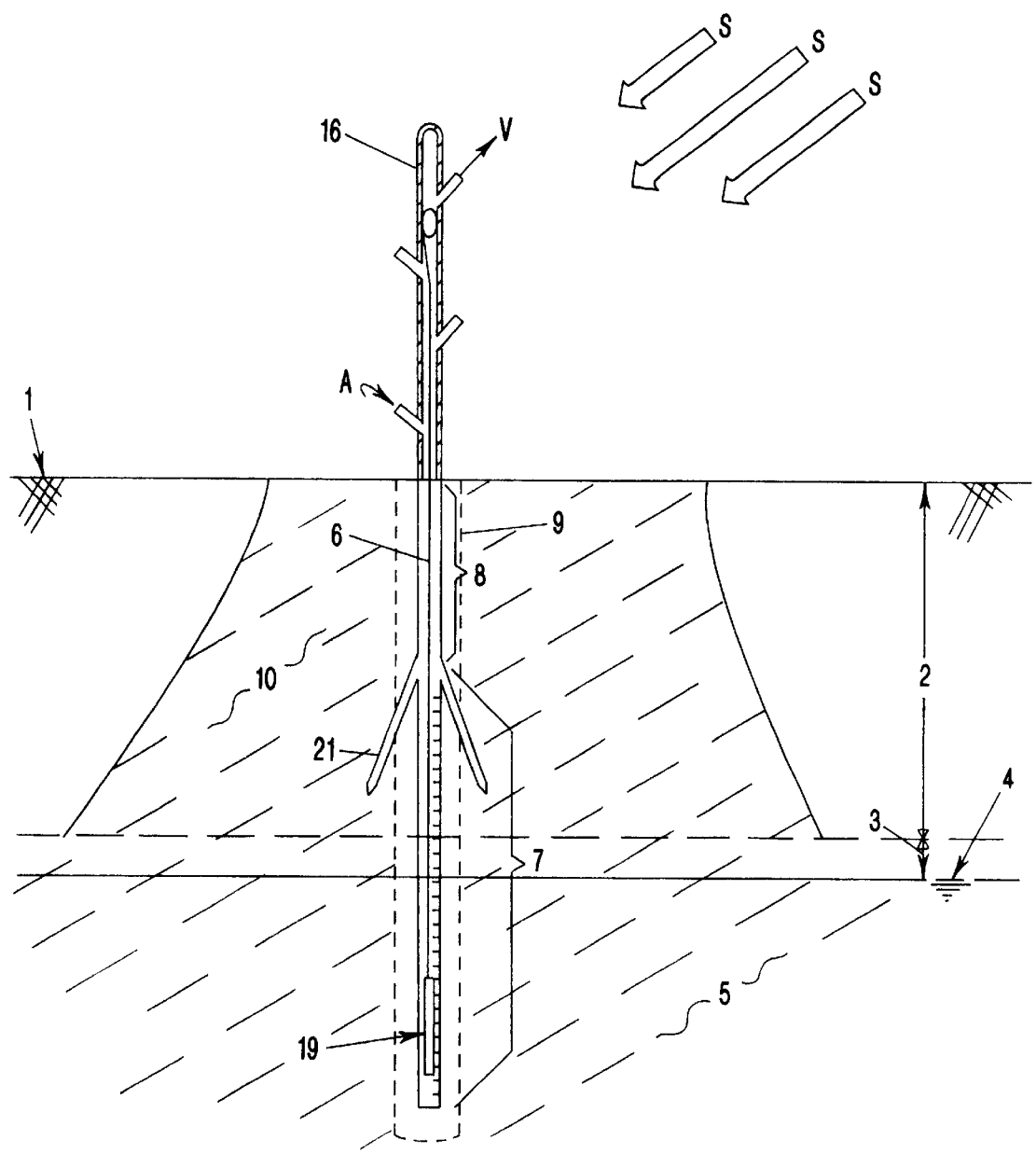
FIG. 6 is a schematic diagram of a smaller apparatus with embodiments useful in the present invention.

Without enhancement, the rate of oxygen transfer to ground water 5 is controlled by the horizontal width, length, or diameter of the structure 6 (the static area of ground water exposure to air) shown in FIG. 1. Increasing the area of contact between ground water 5 and ambient air A (above that provided merely by exposure inside the structure 6) can be accomplished in many ways. Additional vents 11 can also be installed to improve air flow through the structure and air pumps can be added to these vents to further enhance oxygen transfer. Ground water 5 can be aerated inside the structure 6 either by providing compressed air 19 directly to the ground water 5, as shown in FIGS. 2 and 5 (diffused aeration), by spraying ground water W up into the air inside the structure 6, as shown in FIG. 3 (spray aeration), or by cascading water over a bed of media while forcing air to flow countercurrent to the water as shown in FIG. 6 (packed column aeration). Spraying water up inside the structure beneath a sunlight transmitting, non-porous cover 16 will also allow solar energy to heat the water W directly.

FIGS. 3 and 6 shows further enhancement for removal of contamination in the vadose zone 2 soil. The structure 6 sidewalls shown in FIGS. 3 and 6 can be modified to allow water, aerated and heated by spraying at the top of the structure 6, to flow into the vadose zone 2. Flow to the vadose zone 2 is accomplished using a fluid permeable horizontal section of the structure 20 or a fluid permeable conduit 21 placed at an angle into the vadose zone 2. The fluid permeable conduit 21 placed at an angle into the vadose zone 2 is provided with an interior lip to collect water spray flowing down the sides of the structure 6. Supplying aerated and heated water W to the contaminated vadose zone 2 will provide the oxygen, warmth and additional soil moisture needed to further promote biodegradation of contaminants.

Since Henry's constant increases with temperature, the present invention used to increase air A and water W temperatures inside the structure will further increase removal of contaminants to the air phase where they can be vented from the structure. Temperature is also an important factor affecting not only abiotic contaminant removal but also biotic contaminant removal. For every 10° C. increase in temperature, microbial activity is doubled. The coefficient for gas diffusion $K_g$ also increases with increasing temperature. Heating the air and/or ground water will further enhance oxygen transfer to the water phase. The present invention is designed to increase subsurface temperatures using solar energy or other power sources.

Increasing the temperature of the subsurface air, soil, and ground water can be accomplished in many ways using the current invention. A sunlight transmitting, non-porous cover 16 that allows solar energy to enter can be used as shown in FIGS. 2, 3, and 6 to allow solar energy S to enter the structure 6 and heat the air and/or water inside. Lenses, prisms and mirrors 17 shown in FIG. 2 can be used to intensify the solar energy S and redirect down the interior of the structure 6, directly onto the contaminated ground water, increasing both the temperature of the ground water and aqueous photolysis. Aqueous photolysis is a process that degrades contamination in water and may occur directly or indirectly. Direct photolysis involves the absorption of light by contaminant in water, placing its electrons in and excited state from which reactions can occur that degrade the contaminant. Indirect photolysis occurs when another chemical absorbs light, and in its exited state, undergoes reaction with the contaminant. By focusing solar energy or other light into ground water 5, the present invention assists aqueous photolysis of contamination in ground water. Ventilation of the structure 6 can be controlled using vent valve 15 to control the inside temperature, release of volatilized contaminants V and oxygen supply.

Figure 4:
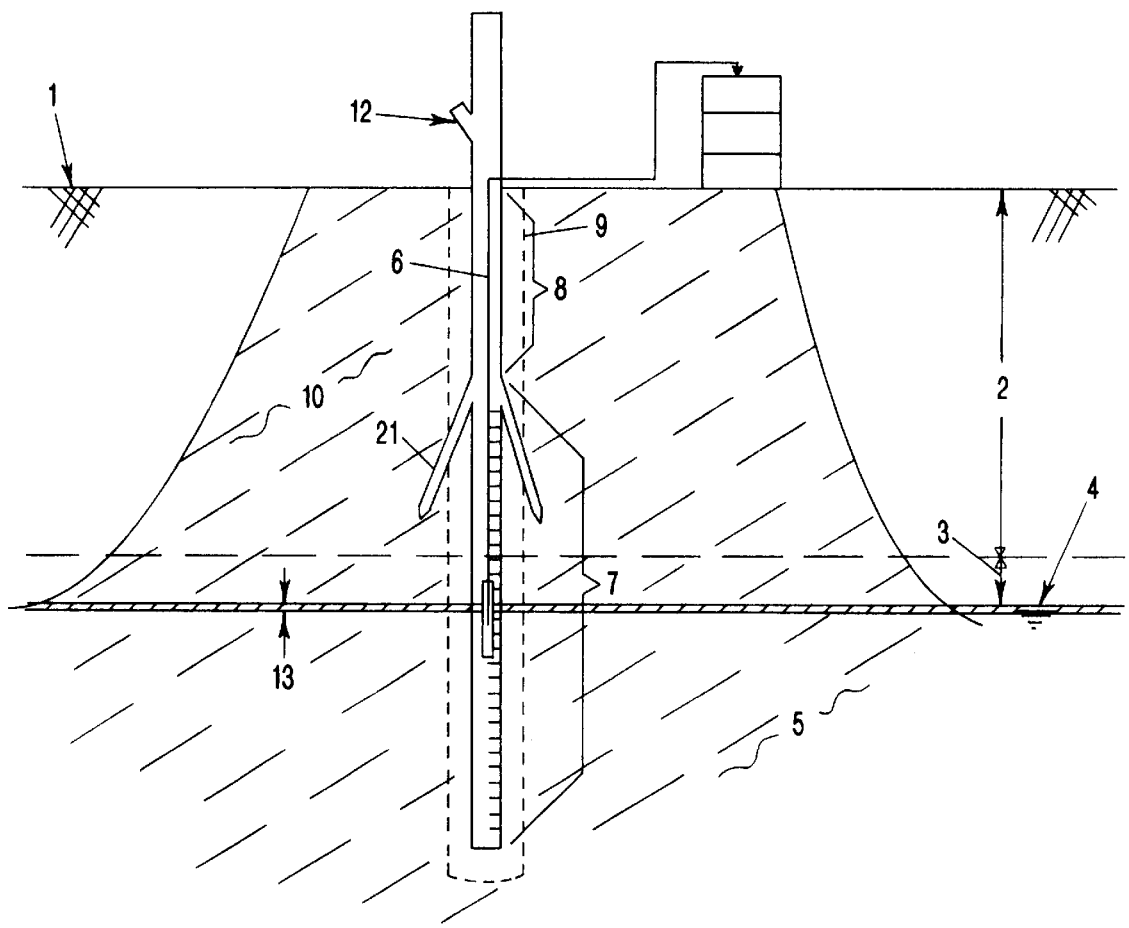
FIG. 4 is a schematic diagram of a smaller apparatus useful in the present invention.

Optimum microbial activity occurs within a pH of 6.0–8.0 with slightly alkaline conditions being more favorable. Nutrients such as nitrogen and phosphorous are commonly deficient in soils. Nutrients and pH adjustment, or oxygen release compounds can be added directly to the ground water using the access port 12 to enhance biodegradation of contaminants. Other treatment systems can be installed in the structure to further enhance degradation and removal processes. Aquatic plants and organisms can be placed inside the structure to further enhance removal by bioconcentration of the contaminants by the plants or organisms.

Where the expense of reaching the ground water by excavation or large diameter borehole and/or using the structure shown in FIGS. 1 through 3 is restrictive, the present invention includes the enhancements shown in FIGS. 4 through 6. FIGS. 4 though 6 show a narrow structure 6, equipped with a fluid permeable conduit 21 placed at an angle into the vadose zone 2. In this application, the fluid permeable conduit 21 is attached to the structure 6 with a spring loaded hinge. When the structure 6 is placed in the bore hole 9, the fluid permeable conduit 21 is parallel with the structure 6. When the structure is located at the correct depth, the fluid permeable conduit 21 is released to protrude into the sidewalls of the borehole 9 and the entire structure is pushed down into the borehole pushing the fluid permeable conduit 21 further into the vadose zone 2 soil.

The enhancement shown in FIG. 4 is a narrow diameter version of the invention shown in FIGS. 1 and is shown in a configuration to recover LNAPL. Once the LNAPL is recovered, the enhancement shown in FIG. 4 can be modified to enhance subsurface exposure to ambient air A and heat from solar energy or other sources of energy.

The device shown in FIG. 5 also exposes the subsurface soil and ground water to ambient air A through the pumping of air into the ground water 5 using an air pump 18. In remote locations, a wind driven propeller 22 can be used to provide mechanical, electrical, or air power to pump air into underground water or to pump ground water W for spray or packed column aeration. In areas with external power sources the propeller (wind mill) is not needed since a pump or compressed air supply may be provided by externally powered devices.

The device shown in FIG. 6 exposes soil and ground water to ambient air A and ground water W to solar energy S by spraying ground water W up into the structure beneath a sunlight transmitting, non-porous cover 16 or by other power sources. A sunlight absorbing structure above ground can also be used instead of the sunlight transmitting, non-porous cover 16. To assist with aeration of the water in a narrow diameter application, a packed column 23 can be installed in the structure 6. Water is pumped up to the top of the packed column where it is distributed on top of the packed column 23 which consists of media designed to transfer oxygen in ambient air A to the descending ground water W. Ambient air flow A is provided by a pump 18 through the access opening 12. Ambient air A will flow up through the packed column 23 and descending ground water W volatilizing contaminants from the water to the air phase V. Once in the air phase the air phase contaminants V can be released using the vent 11, controlled using a valve on the vent 15 or a treatments system attached to the vent. Aerated and heated water W then flows down the structure 6. The fluid permeable conduit 21 placed at an angle into the vadose zone 2 is provided with and interior lip to collect water spray flowing down the sides of the structure 6 so the water will flow through the vadose zone 2. Ambient air A may also flow down the structure into the vadose zone 2.

INDUSTRIAL APPLICABILITY

The invention is further illustrated by the following non-limiting example.

EXAMPLE

A test was conducted using the structure shown in FIG. 1 without the LNAPL pump or the direction of solar energy into the ground water, ground water aeration or pumping to further promote the evaporation, volatilization, biodegradation, and or other abiotic and biotic methods of contaminant removal from ground water. The site was the former location of a 1,000 gallon underground storage tank that leaked No. 2 diesel fuel directly into ground water. The bottom of the underground storage tank was located at the ground water table. In addition to No. 2 diesel fuel, ground water was also contaminated by gasoline from a leaking above ground storage tank located on adjacent property. The site is located in the northeastern United States.

Contaminated soil surrounding the underground storage tank was removed for offsite disposal by excavation. After removal of contaminated soil, the excavation was lined with a geomembrane. A structure similar to that shown in FIG. 1 was place in a deepened portion of the excavation, on the geomembrane, so that the bottom of the structure extended approximately three (3) feet into the ground water table. As shown in FIG. 1, the bottom and sides of the structure were water permeable. The top five (5) feet of the structure were water impermeable. The top of the structure was placed approximately two (2) feet above ground surface. After installation, the entire excavation was filled with three (3) inch crushed stone.

Prior to installation of the structure, the surface of the ground water in the excavation had visible LNAPL layer (sheen) on the surface. Two (2) samples of the ground water were obtained before installation of the structure indicating the ground water contaminants present were as shown below:

Ground water Contamination before Installation of Present Invention

| Detected Compound | Ground water Concentration (ug/l, micrograms per liter which is equivalent to parts per billion) |
| --- | --- |
| Total Diesel Fuel Range Hydrocarbons | 96,000 |
| Benzene | 140 |
| Toluene | 320 |
| Ethylbenzene | 27 |
| Xylenes (total) | 480 |

The structure was installed in the beginning of the summer with ambient air temperatures in the range of 70° F. to 90° F. The top of the structure was heated by solar energy that also heated the air and ground water inside the structure. The top of the structure was provided two access ports that had small vents. After approximately two (2) months of installation the ground water in the structure was sampled and the following results were obtained.

Ground water Contamination after Two (2) Summer Months of Installation of Present Invention

| Detected Compound | Ground water Concentration (ug/l, micrograms per liter which is equivalent to parts per billion) |
| --- | --- |
| Total Diesel Fuel Range Hydrocarbons | Not Detected at a detection limit of 100 ug/l |
| Benzene | Not Detected at a detection limit of 1 ug/l |
| Toluene | Not Detected at a detection limit of 1 ug/l |
| Ethylbenzene | Not Detected at a detection limit of 1 ug/l |
| Xylenes (total) | Not Detected at a detection limit of 1 ug/l |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of decontamination of ground water a soil, the method comprising the steps of:

a) providing to an excavation below a vadose zone a structure comprising one or more clear or translucent areas permitting ingress of sunlight into the structure;

b) placing the structure within soil and ground water;

c) exposing the contaminated material to sunlight and atmospheric gases and venting resulting gases; and d) aeration of ground water within the structure.

2. An apparatus for decontamination of ground water and soil, said apparatus comprising:

an excavation from earth's surface to a subsurface below a vadose zone;

a structure in said excavation, said structure comprising:
one or more clear or translucent areas permitting ingress of sunlight into said structure;
a fluid-impermeable lining extending from earth's surface to the subsurface; and
a fluid- and gas-permeable lining connected to and extending from a bottom of said fluid-impermeable lining and into contaminated ground water and soil;

means for circulating ground water into, through, and out of said structure; and means for ae rating the ground water and soil within said structure.

* * * * *